Feb. 15, 1938.  A. BACKSTROM  2,108,467
BRAKE MECHANISM
Filed May 11, 1937  2 Sheets-Sheet 1
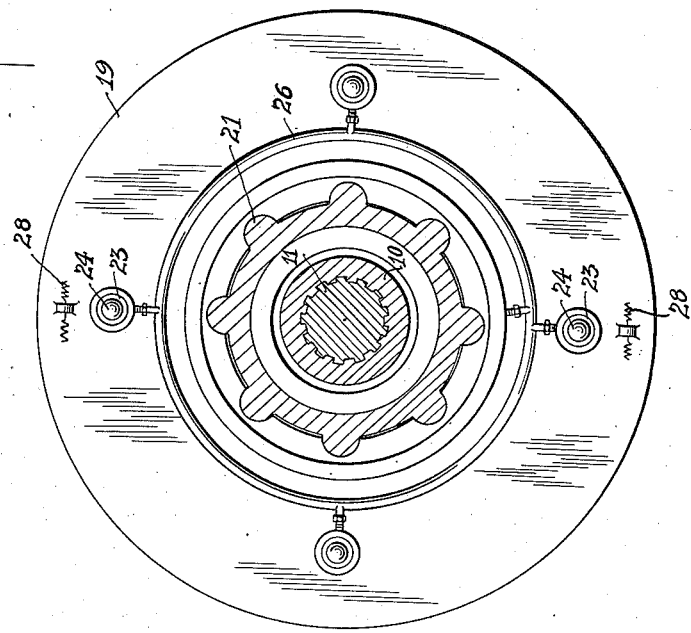
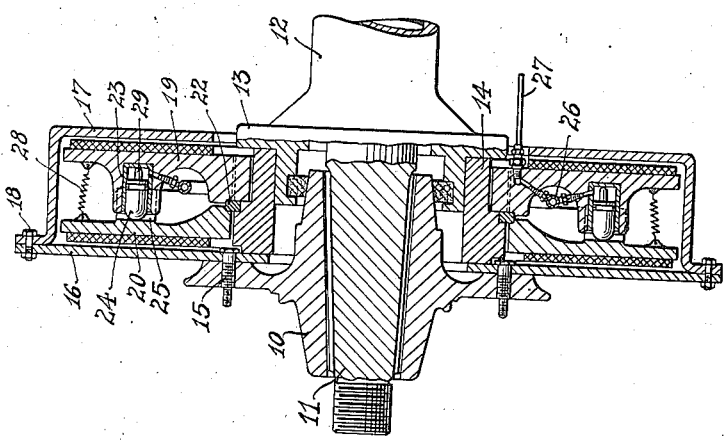
INVENTOR
ADOLPH BACKSTROM
BY
ATTORNEY Feb. 15, 1938. A. BACKSTROM 2,108,467
BRAKE MECHANISM
Filed May 11, 1937 2 Sheets-Sheet 2
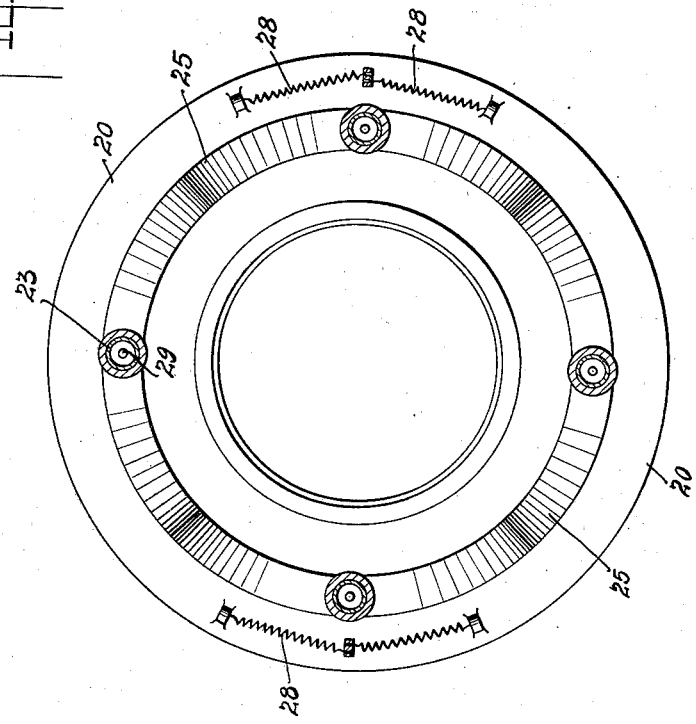
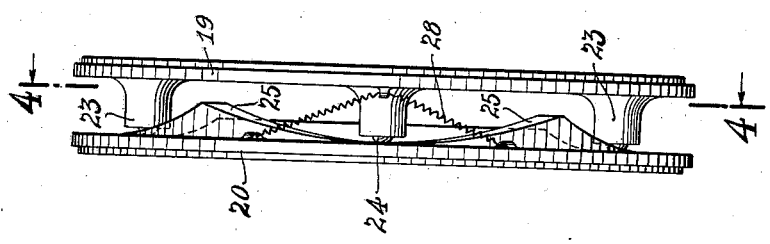
INVENTOR
ADOLPH BACKSTROM
BY
ATTORNEY Patented Feb. 15, 1938

2,108,467

UNITED STATES PATENT OFFICE 2,108,467

BRAKE MECHANISM

Adolph Backstrom, Hempstead, N. Y.

Application May 11, 1937, Serial No. 141,897

4 Claims. (Cl. 188—72)

My invention relates to brake mechanisms, and more particularly to motor vehicle brakes wherein the brakes are applied and released by fluid or other pressure subject to manual control.

Objects of the invention are: (1) To substantially increase the effective contact area, as compared to present practice, and to consequently permit of decreased pressure per unit of such area; (2) to so organize the mechanism of the brake control as to admit of an automatic progressive intensification of the braking pressure once braking contact between the brake-shoes and the brake-drum of the mechanism is established; (3) to insure perfect equalization of the braking pressure under all operating conditions; (4) to minimize the physical effort required to be expended in effecting an application of the brakes; and (5) to provide a brake mechanism applicable, without substantial modification, to various types of vehicle wheels, both front and rear.

Other objects and advantages of the invention will be hereinafter more fully set forth.

In attaining the stated objects of the invention, a brake mechanism comprising a two-sided brake drum is provided. Between the two sides of the brake-drum, two brake-shoes are disposed. These brake-shoes are movable axially from a normally inactive position out of braking contact with the brake-drum to an active position wherein braking contact between both brake-shoes and the brake-drum is maintained. One of the brake-shoes is rotationally fixed and the other is loosely mounted. The loosely mounted brake-shoe is movable circumferentially relatively to the fixed shoe, and carries on its inner face a cam, and it is by means of this cam that the automatic progressive increase in intensity of braking pressure is obtained as contact between the loosely mounted brake-shoe and the brake-drum is effected. Hydraulic or other appropriate manually operable control means is provided to render the brake-shoes active or inactive at will.

In the drawings, wherein like reference characters denote like or corresponding parts:

Fig. 1 is a transverse vertical sectional view, partly in elevation, of the brake mechanism of my invention fitted to the hub of a vehicle wheel;

Fig. 2 is a section at right angles to the section of Fig. 1;

Fig. 3 is an edge view or side elevation, of the coacting brake-shoes positioned as is the case when the brake is inactive; and Fig. 4 is a section on the line 4—4 of Fig. 3.

In the embodiment of the invention selected for illustration, the reference character 10 designates the hub of a vehicle wheel, 11 the spindle on which the hub is journaled, 12 the wheel axle, and 13 the axle-end around which a mounting collar 14, embracing the spindle 11, is adapted to be fastened by any suitable means.

Rigidly secured as at 15 to the hub 10 of the wheel is a two-part or two-sided brake-drum 16—17. One said part, i. e., the part 16, bears directly against the hub-flange, whereas the other said part, i. e., the part 17, overhangs the axle-end and is fastened as at 18 to the first said part. It is between these two drum-parts that the coacting brake-shoes 19 and 20 are disposed.

The brake-shoe 19 is mounted on the collar 14 for axial movement into and out of braking contact with the drum-part 17. By means of interfitting splines 21 formed on said collar 14 and on the brake-shoe 19, the latter is held rotationally fixed, notwithstanding its freedom to move axially. The brake-shoe 20, on the other hand, may be described as floating. That is to say, it is not only axially movable, but it is free also to move circumferentially relative to the brake-shoe 19, once braking contact between the brake-shoes and the drum-brake is established. A ring 22 encircling the collar and intermediately located between the brake-shoes acts to hold the latter apart when inactive.

The means herein disclosed to manually control the spreading of the brake-shoes is a hydraulic means. It consists of a plurality of cylinders 23, pistons 24, one for each cylinder, of which there are preferably four, and an undulating cam 25, in the form of an annulus. The cylinders 23 are connected in series as by an annular duct 26 open to each cylinder near its inner end. This duct 26 encircles the collar 14, and like the cylinders and pistons, is carried by the rotationally fixed brake-shoe 19. By means of said duct and a suitable pipe connection 27, fluid pressure is introduced into said cylinders and behind the pistons to force the latter axially, and hence the two brake-shoes apart. The means for controlling the flow of fluid into and out of the cylinders 23 forms no part of the present invention and is therefore neither shown nor described. Suffice it to say that any appropriate means, manually controllable at will, is all that need be provided.

It will be noted upon reference to Figs. 3 and 4 that the cam 25, mounted on the circumferentially movable brake-shoe 20, is directly opposed to the pistons 24, and that said pistons bear at their outer ends on the cam surface at all times. The shape of the cam is such that it is provided with "low points" and "high points" corresponding in number to the number of pistons employed, the "low points" in each instance being disposed midway between the "high points" so that as the brake-shoe 20 is circumferentially displaced, all of said pistons will ride simultaneously onto the sloping surfaces of the cam in a like manner and to the same extent. Obviously, therefore, as the brake-shoe 20 moves circumferentially, the brake-shoes are urged apart to progressively automatically intensify the braking action or pressure. To prevent locking of the brake-shoes, all that is required is for the operator to ease off on the manually operated brake control pedal (not shown) so that the fluid in the cylinders may be displaced or forced out from behind the pistons, whereupon, by means of springs 28, the brake-shoes are moved from an active to an inactive position. The springs 28 are preferably so placed and angled as to at all times exert a force tending to return the brake-shoes to an inactive position, whereat all of the pistons make contact with the "low points" on the cam. Stops 29, mounted on the inner piston ends, prevent the pistons from moving too far inwardly within the respective cylinders. The springs 28, it will be noted, are fastened at their opposite ends to the respective brake-shoes.

The operation of the brake mechanism is believed to be apparent. With the brake-shoes in an inactive position, all that is required to be done to apply the brakes, is to force the brake-shoes apart. This is effected by admitting simultaneously behind the pistons 24 and within the cylinders 23, fluid under pressure. As the pistons are axially displaced within the cylinders, the brake-shoes 19 and 20 are correspondingly forced or spread apart. In spreading the brake-shoes apart, the brake-shoe 19 is forced into braking contact with the brake-drum part 16, while at the same time, the brake-shoe 20 is forced into braking contact with the brake-drum part 17. As braking contact between the latter brake-shoe and the brake-drum is established, and so long as the brake-shoes are held thus spread by the manually controlled fluid pressure, a gradual or progressive increase in intensity of braking pressure is obtained, due to the action of the cam surface 25. This automatic action follows from the fact that the cam 25 is carried by the loosely mounted, and hence circumferentially movable brake-shoe 20, whereas the coacting brake-shoe 19 is held circumferentially fixed.

In conclusion, it may be pointed out that in the organization just described, the braking pressure, acting through the pistons 24, is more or less equalized, and an equal distribution of the pressure throughout the entire area of the frictionally engaged faces is obtained.

Moreover, because of the balanced application of pressure in opposite directions, all undesirable axial thrust upon the wheel, either inwardly or outwardly, is avoided.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a brake mechanism, a brake-drum, brake-shoes movable axially from a normally inactive position out of braking contact with said brake-drum to an active position wherein braking contact between said brake-shoes and said brake-drum is maintained, one said brake-shoe being rotationally fixed and the other said brake-shoe being loosely mounted whereby free relative circumferential movement between it and said first mentioned brake-shoe is induced once contact between the loosely mounted brake-shoe and the brake-drum is established, means responsive in its operation to relative circumferential movement of said loosely mounted brake-shoe adapted to automatically progressively intensify the braking pressure once said brake-shoes are rendered active, and means interposed between said brake-shoes and completely housed within said brake-drum adapted to render said brake-shoes active or inactive at will.

2. In a brake mechanism, a brake-drum, brake-shoes movable axially from a normally inactive position out of braking contact with said brake-drum to an active position wherein braking contact between said brake-shoes and said brake-drum is maintained, one said brake-shoe being rotationally fixed and the other said brake-shoe being loosely mounted whereby free relative circumferential movement between it and said first mentioned brake-shoe is induced once contact between the loosely mounted brake-shoe and the brake-drum is established, a cam means carried by said loosely mounted brake-shoe adapted to automatically progressively intensify the braking pressure once said brake-shoes are rendered active, and means interposed between said brake-shoes and acting directly against said cam means to render said brake-shoes active or inactive at will, said last mentioned means being completely housed within the confines of said brake-drum.

3. In a brake mechanism, a brake-drum, brake-shoes movable axially from a normally inactive position out of braking contact with said brake-drum to an active position wherein braking contact between said brake-shoes and said brake-drum is maintained, one said brake-shoe being rotationally fixed and the other said brake-shoe being loosely mounted whereby relative circumferential movement between it and said first mentioned brake-shoe is induced once contact between the loosely mounted brake-shoe and the brake-drum is established, a cam means carried by said loosely mounted brake-shoe adapted to automatically progressively intensify the braking pressure once said brake-shoes are rendered active, a member carried by said rotationally fixed brake-shoe, said member being axially movable into and out of engagement with said cam means to render said brake-shoes active or inactive, and means manually operable to control at will the relative movement of said member.

4. In a brake mechanism, a brake-drum, brake-shoes movable axially from a normally inactive position out of braking contact with said brake-drum to an active position wherein braking contact between said brake-shoes and said brake-drum is maintained, one said brake-shoe being rotationally fixed and the other said brake-shoe being loosely mounted whereby relative circumferential movement between it and said first mentioned brake-shoe is induced once contact between the loosely mounted brake-shoe and the brake-drum is established, an undulating cam in the form of an annulus carried by said loosely mounted brake-shoe adapted to automatically progressively intensify the braking pressure once said brake-shoes are rendered active, a plurality of cylinders and pistons carried by said rotationally fixed brake-shoe, said pistons being movable simultaneously axially relatively to said brake-shoes to render said brake-shoes active or inactive, and hydraulic means operable to control at will the relative axial movement of said pistons.

ADOLPH BACKSTROM.